United States Patent
Witter et al.

(10) Patent No.: US 12,303,818 B2
(45) Date of Patent: May 20, 2025

(54) BENCHTOP DUST COLLECTOR

(71) Applicants: Robert M. Witter, Englewood, FL (US); Jeffrey Hill, Cicero, NY (US); John J. Fitzsimmons, Syracuse, NY (US); Kyle W. Groening, Syracuse, NY (US); Joseph Baldwin, Syracuse, NY (US)

(72) Inventors: Robert M. Witter, Englewood, FL (US); Jeffrey Hill, Cicero, NY (US); John J. Fitzsimmons, Syracuse, NY (US); Kyle W. Groening, Syracuse, NY (US); Joseph Baldwin, Syracuse, NY (US)

(73) Assignee: Oneida Air Systems, Inc, Syracuse, NY (US)

( * ) Notice: Subject to any disclaimer, the term of this patent is extended or adjusted under 35 U.S.C. 154(b) by 563 days.

(21) Appl. No.: 17/685,975

(22) Filed: Mar. 3, 2022

(65) Prior Publication Data

US 2022/0288524 A1    Sep. 15, 2022

Related U.S. Application Data

(63) Continuation-in-part of application No. 29/773,914, filed on Mar. 12, 2021, now Pat. No. Des. 960,341.

(60) Provisional application No. 63/160,069, filed on Mar. 12, 2021.

(51) Int. Cl.
*B01D 46/52* (2006.01)
*B01D 46/79* (2022.01)
*B24B 55/06* (2006.01)
*B27G 3/00* (2006.01)

(52) U.S. Cl.
CPC .......... *B01D 46/521* (2013.01); *B01D 46/79* (2022.01); *B24B 55/06* (2013.01); *B27G 3/00* (2013.01)

(58) Field of Classification Search
CPC ........ B01D 46/52; B01D 46/79; B01D 46/10; B01D 46/521; B01D 46/64; B24B 55/06; B27G 3/00
See application file for complete search history.

(56) References Cited

U.S. PATENT DOCUMENTS

2016/0175752 A1*  6/2016  Jaganathan ............ B01D 46/62
                                                                55/486

OTHER PUBLICATIONS

Bench Top Dual Fan Dujst Filter model G9955 Instruction Manual, Grizzly Industrial, Inc., Apr. 2004.

* cited by examiner

*Primary Examiner* — Sharon Pregler
(74) *Attorney, Agent, or Firm* — Bernhard P Molldrem, Jr.

(57) ABSTRACT

A bench-top dust collector has a front or intake side where air is directed by a cowling into a pre-filter and then a final filter that are held in a frame. A rear compartment holds an array of small high velocity fans that pull the air through the filters to a plenum in the rear compartment. The filtered air in the plenum is discharged through a grill in a downward and rearward direction. The unit is compact and configured to be about the size and shape of an attaché case.

20 Claims, 7 Drawing Sheets

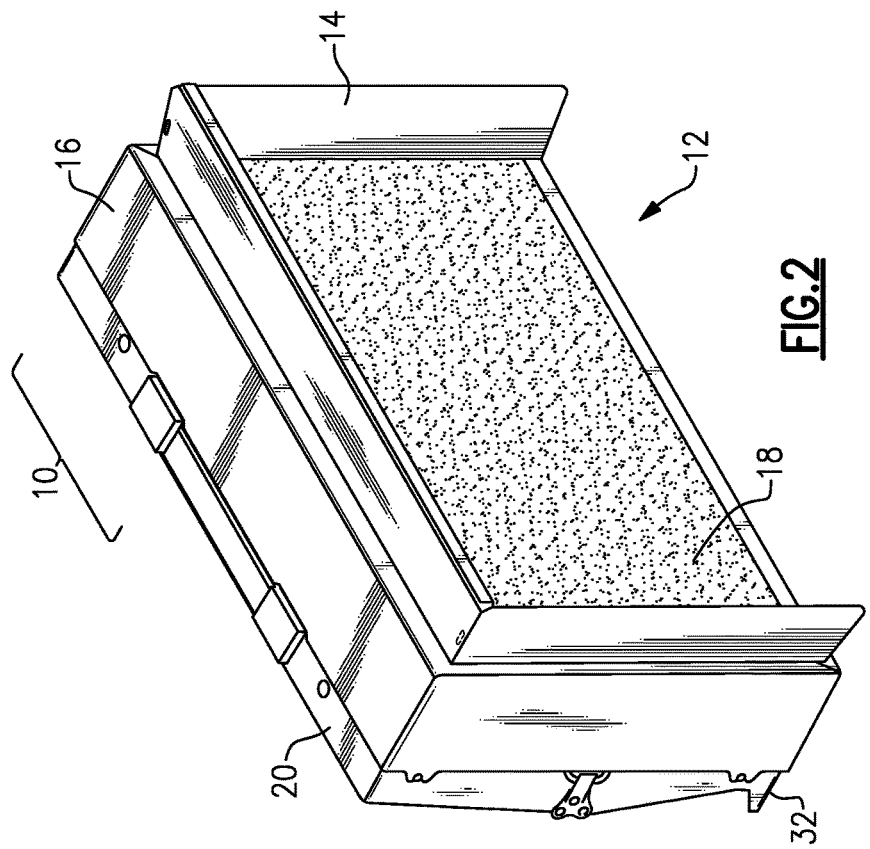
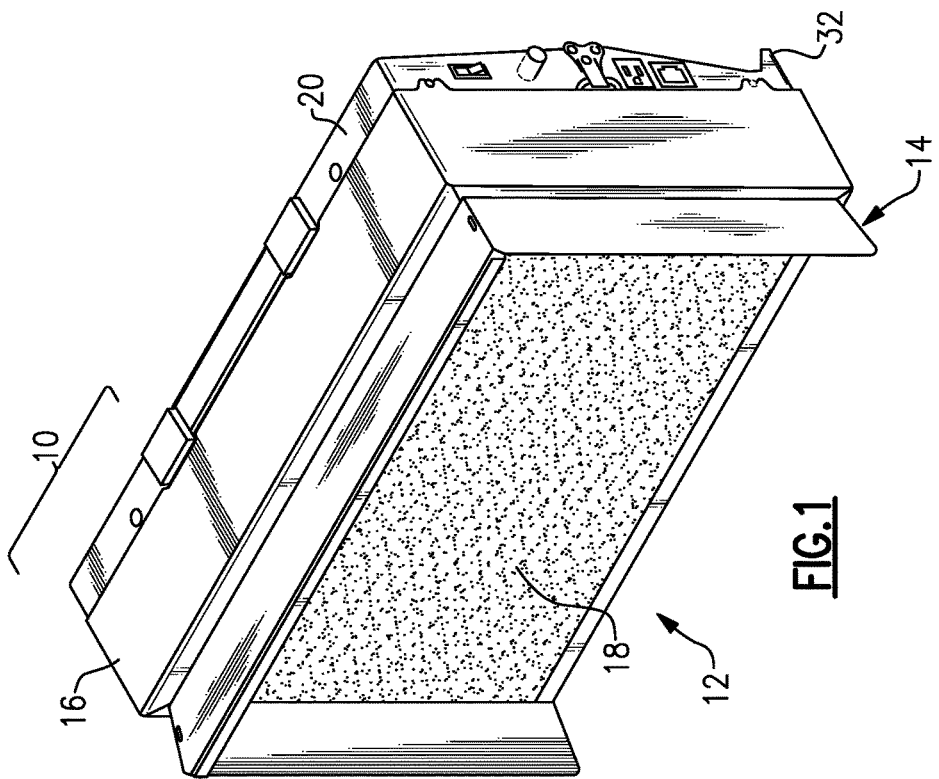

BENCHTOP DUST COLLECTOR

This application claims priority under 35 U.S.C. § 119(e) of our U.S. Provisional Patent Application Ser. No. 63/160,069, filed 12 Mar. 2021, and the contents and disclosure whereof are incorporated by reference herein. This is also a continuation in part of our copending Design application Ser. No. 29/773,914, Mar. 12, 2021, pending.

BACKGROUND OF THE INVENTION

Dust collectors can be divided into two general categories, source collection and ambient collection. Ambient collection involves cleaning the general or ambient room air, where the dust from one or more sources, e.g., saws, sanders, etc., has mixed in with the ambient room air. This occurs where the dust source does not have a dust port that can be connected by a hose or conduit to a dust extractor. Ambient dust collectors filter the room air only after the air is contaminated by dust that has escaped from dust making devices, either due to lack of source collection or due to lack of an ineffective source collection port on the machine that produces the dust-laden air. Ambient dust collectors can possibly be beneficial as a backup air cleaners, but by themselves are not able to reduce airborne particulates to acceptable levels and are not acceptable as a primary air cleaner Source collection typically utilizes duct or hose connections on dust making machines that suck dust directly from the cutting or sanding areas, then airborne dust flows out from a dust port on the dust producing machine, through a conduit and into a dust extractor. Typically, tools for finer work, such as sanding or carving a wooden workpiece, do not have a dust collection port, so the dust they produce mixes in with the ambient air. Thus there has been a need for an improved dust collection device to resolve the problem of dust produced by use of these smaller tools. Activities such as hand sanding, carving, rotary tool use, and power sanding create dust that is difficult to collect, and thus drifts into the ambient air around the workpiece, which creates health, fire, and housekeeping risks. This airborne dust can settle onto surfaces contributing to these health and safety problems. These effects have resulted in proposed dust collection devices that can be placed near the workpiece, and can optimally be located directly on the workbench where the carving, sanding, or other operation takes place.

A benchtop dust control unit can serve to collect and control the dispersal of dust when used with equipment that lacks a dust exhaust port, and there is no hose connection possible between the dust-creating tool and a dust extractor.

In currently available benchtop dust collection units, there is a pressure loss at the intake side which has not been adequately addressed to date. As air enters a duct, such as the air intake of a bench-top unit, a vena contracta is formed and an energy loss occurs (In this case the duct or intake port is an open side of the housing of the benchtop collector). The energy loss occurs because there is a conversion of static pressure to velocity pressure. Hoods, cowlings or flanges at a pipe opening are useful in reducing air friction and entry losses by creating a more laminar flow into the duct, but much of the production dust still enters the ambient air.

Activities such as hand sanding, carving, rotary tool use, and power sanding all make dust that is difficult to collect and will drift around the work area creating health, fire and housekeeping issues. Ambient dust collectors only clean the air after the dust has been dispersed; this is ineffective for dust control since the worker will in the meantime be exposed to the dust-laden air. The dust-laden air may not be drawn into the ambient collector and may instead flow into other areas and deposit dust or expose persons.

Existing dust control approaches for use with the dust creating devices discussed above art can be, for example, down draft tables, for example, a horizontal chamber with either self-contained blowers or a connection to a central dust collector. One downside to this configuration is that the down draft table raises up the work surface to an inconvenient height for the worker. It also takes up the work-bench space and is bulky and inconvenient to store.

One existing dust control approach employs a dust collector such as the Grizzly G9955 (San Ford Machines Co. Ltd, Taicchung, TW) which has two low-static-pressure fans, no pre-filter, and only two speeds. The unit's two low-static-pressure fans create too little pressure to be used with a smaller-size particle filtration means, such as a HEPA filter, because they would not overcome the higher resistance of those filters especially after they have become loaded with dust. That unit's most effective dust removal zone is within a clear plastic box that extends off the front of the unit, in effect, functioning as a fume hood. With that unit, the dust-making work is intended to be carried out inside the clear plastic enclosure or very close to it. The box shape lacks the aerodynamic design to create an air wall or clear air bubble where the air outside of the physical enclosure is pulled inward and away from the user. The unit also has an undesirable deep foot print which takes up more of the workbench work space.

Other existing dust control devices include ambient dust collectors made by many manufacturers, an example is the JET AFS-1000B which is intended to be hung from the ceiling and filter the upper room air after the air has been contaminated by dust not collected at the source. Another example of an ambient dust collector is the Axiom Stratus cylindrical floor sanding dust collector. Because this type of dust collector is not a source collector, these units are not effective at lowering airborne particulate to acceptable levels. Like other ambient dust collectors, this device picks up and removes only a fraction of the harmful dust that has escaped into the room air.

OBJECTS AND SUMMARY OF THE INVENTION

Our invention is a source dust collector intended to be used with tools without a hose connection or with tools having an inadequate dust collection port or collection design. An embodiment can consist mainly of a chassis that is fabricated of steel sheet metal coated with a baked-on powder finish, and the chassis can be in the form of a box or enclosure in which an array (e.g. of six) high pressure computer fans are mounted so as to more-or-less align with openings in the chassis. The chamber that the fans blow the air into can include sound absorbing baffles, as well as variable speed circuitry, a low voltage power supply, and connections to an accessory outlet and to a socket for an incoming current line cord. An open frame, which holds the pre-filter and final filter(s) is clamped to the chassis immediately downsteam downstream of the frame and filters, to hold the primary and final filters in place and also to provide support for the intake cowling. Thus, embodiments of this invention form, in general terms, a source dust collector that collects dust from a dust creating tool in activities such as sanding, carving, or rotary tool use, that have no dust port or may have inadequate dust porting. Embodiments of the invention which include cowling around their inlet face, on a front or proximal side of the unit, create a three-dimensional air wall or air bubble that extends out from the inlet face for about 24 inches, in which the dust making activities result in the dust being contained and drawn into the dust collector and away from the user. These units also contribute less noise than other types of dust collection equipment.

In one preferred embodiment, the benchtop DC embodying this invention has a main chassis, in the form of a rectangular box, resembling in shape and size an attaché case. This unit can be placed directly on the workbench near the workpiece that is to be sanded or formed, with the workpiece being placed within the space of an air flow zone that extends forward of the unit. The main chassis may preferably be formed of flat sheet-metal steel, coated with baked-on powder finish, forming a box enclosing six high pressure computer fans (in one favorable embodiment) mounted so as to align with openings or perforations (e.g., grillwork) in the chassis. The cowling vanes may alternatively be made of a synthetic plastic, favorably one that disperses static charge. The fans blow into a chamber that contains sound absorbing baffles, variable speed circuitry, a low voltage power supply and connections to an (optional) accessory outlet as well as a cable that connects to a source of incoming line current. A perforated metal panel or grille provides an outlet for the clean air. A secondary open frame clamps the pre-filter panel and the primary filter in place and provides as well a support for the cowling. The outlet grille is configured to direct the outlet filtered air in a rearward and downwardly angled direction. In some embodiments, the unit may include a rechargeable battery to permit use away from an AC power source.

The dimensions of the assembled unit of this invention can favorably be approximately 16 inches high, 25 inches wide and 8 inches deep plus the removable cowling which extends about 3 inches off the front inlet face.

The cowling can consist of three vanes, i.e., sheet metal or plastic panels that clip into place. These are removably installed on sides and top of the frame. This allows for a more compact shipping and storage configuration. No special tools are necessary and no bolts or threaded fasteners are required for installation. Alternately the cowling can be a one-piece assembly that is either removable or permanently attached to the filter frame. Other materials such as opaque or clear plastic can be used. * The cowling creates an air flow zone that extends forward of the unit where dust making work can be performed and when that dust-laden air will be sucked into the unit. Dust created within the work zone inside the air wall or bubble will be drawn forward and into the unit. The cowling or hood is designed and dimensioned according to principles of industrial hood design. In this case, the three metal vanes are intended to block air from the back and sides of the unit from flowing into the air intake, i.e., the pre-filter. The vanes extend back just far enough so that air flow proceeds from the ambient forward, extending the useful work zone and removing dust created in the work zone before it can reach the ambient outside of the suction zone of the machine. This design optimizes flow of clean filtered air forward and then into the work zone. A preferred cowling design involves sheet steel blades or vanes, but as an alternative, these vanes may be made of a durable plastic or hard rubber material, and may be translucent or transparent. As another alternative a one-piece or multiple-piece cowling may be formed of a flexible rubber or rubber-like material.

The pre-filter is separate from the final filter, and is typically 16×25 inches by one-half inch thick reticulated polyester foam that is durable and washable, captures chips and coarse dust, and protects the more delicate primary filter from damage. This filter is easily removable and can be hosed off and re-used indefintely. However, this is an inexpensive item and can be furnished together with a replacement primary filter when the latter is ordered by the customer.

The primary filter or final filter is a deep-pleated rectangular filter, typically 16 inches high, 25 inches across and 3 inches deep, consisting of a cardboard frame with wire-reinforced polyester fiber filter media providing a MERV 15 filtration rating. The deep pleats maximize the filter area and also provide a storage area for the collected dust. This filter is not cleanable and is intended to be replaced when the filter media is clogged with dust. The pleated filter is also available from third party retailers.

In some embodiments, a third, intermediate rectangular filter may be used between the pre-filter and final filter, e.g., a disposable filter for retaining bulk material. Also, the filter group may also contain an activated carbon filter element.

The six fans together produce approximately 550 cfm of flow at 1.97 inches of water head equivalent. A variable speed control allows the user to reduce the fan speed for more comfortable operation and lower noise. The speed control may be continuously variable, or may have a number of incremental or discrete fan speeds. In some possible embodiments, there may be an automatic fan speed control that maintains a constant air flow even under the gradual dust loading of the filters. The benchtop unit may also include receptacles for recharging an (optional) internal storage battery.

The unit's features include a carrying handle, two threaded inserts that allow the unit to be hung from the ceiling e.g. to collect dust from a lathe, and an accessory outlet for power tools. Other handy features that may be present include work lighting favorably at the intake side, and indicator lights, which may include a dust load warning light that illuminates when the main or final filter becomes clogged.

In some favorable implementations, the benchtop unit may include a provision for using the unit as a self-contained down draft table by laying it horizontally on its back and adding a work surface panel. A support for the back panel may be easily created for this.

Accordingly, it is an object to provide a dust collector that collects dust at the source from dust collecting activities like hand sanding, carving, rotary tool use and from other powered hand tools such as sanders that have inadequate dust collection ports.

Another possible embodiment can be configured as a smaller, four-fan version, e.g., dimensioned twenty by eight by eight inches, with a molded plastic enclosure and a clear molded plastic cowling, This can be a more economical unit intended for hobbyists A much larger version of the source dust collector can also be made with a fabricated stainless steel chassis, and a three-stage filtration arrangement that includes a washable prefilter, a disposable bulk filter, and a semi-permanent HEPA final filter. Such a configuration could be used to advantage by jewelry makers, artists, dental laboratories, or similar occupations involving polishing and grinding. In any of these, an active charcoal filter may be employed for removal of odors and VOCs.

It is another object to provide a dust collector that is compact in the front-to-back dimension so to use up as little of the work bench as is necessary, and in an embodiment can be 25 inches wide×16 inches high and 8 inches front-toback. For some implementations, with a careful selection of filter components this front to back distance can be made even smaller.

Another object is to have a benchtop DC where substantially the entire vertical front face constitutes the entry face.

A further object is to provide dust collector that draws air into its inlet in such a way as to create an airwall that keeps dust-contaminated air away from the user.

A still further object is to provide a dust collector that uses multiple high pressure fans, capable of providing e.g. 1.97 inches of water column pressure, to allow greater filtration efficiency.

A yet further object is to create a dust collector that has continuously variable-speed fans.

Another object is to provide a dust collector that uses multiple fans, e.g., typically six fans, to create an even flow over the filters for greater usage of the filter capacity and lower back pressure.

A still further object is for a dust collector to employ a washable prefilter that both collects larger particles and protects the primary filter from physical damage.

Another object is to provide a dust collector with a primary filter that has deep pleats, favorably, 2 to 4 inches deep which both provides minimal back pressure and ample storage for accumulated dust.

Another object is to provide the dust collector with a cowling around its inlet that creates an aerodynamic three-dimensional air wall that extends outward approximately about twenty-four inches, and in which dust from dust making activities can be contained such that the dust is drawn into the dust collector.

A still further object is for the dust collector to have a cowling that may be permanently attached or removable and that can be made from metal or plastic in one or multiple pieces and can be transparent if desired.

A significant object is to provide for a dust collector that operates from normal household current and may have low-voltage fans or line-voltage fans that can be varied in speed.

It is another object to provide a dust collector with an accessory outlet that may have an feature that automatically turns the dust collector on and off when the power tool is turned on and off, or vice versa.

It is yet another object to provide collector that has a carrying handle and also has threaded inserts to allow hanging from the ceiling for better positioning, e.g., near a lathe.

DESCRIPTION OF THE DRAWING

FIGS. 1 and 2 are right front and left front perspectives of a bench-top dust control unit embodying this invention.

DETAILED DESCRIPTION OF A PREFERRED EMBODIMENT

Figure 4:
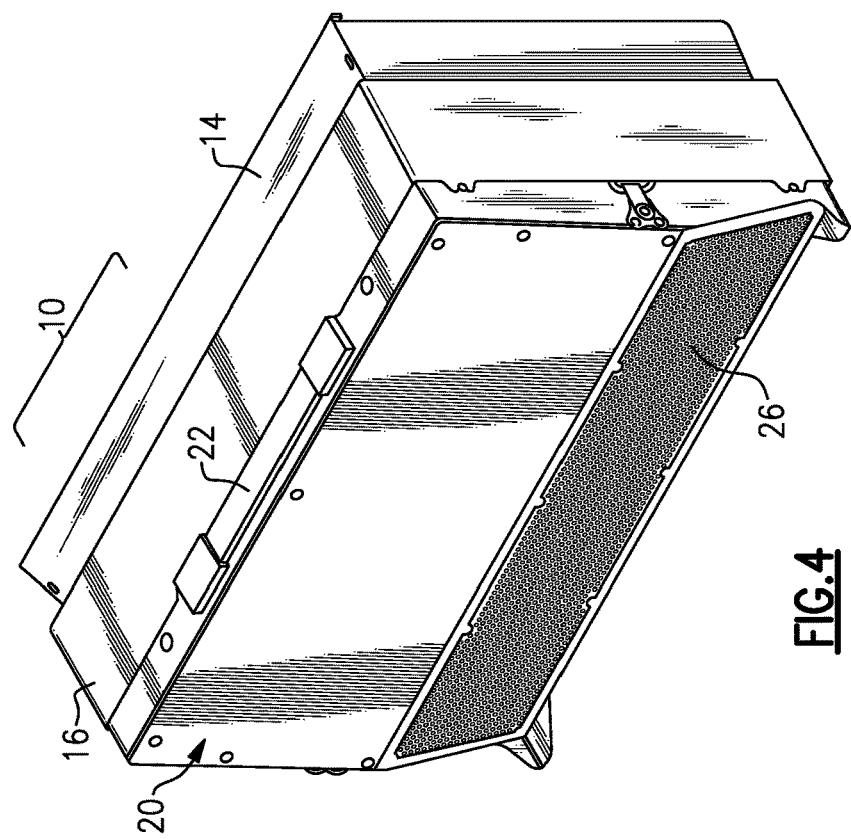
FIGS. 3 and 4 are left rear and right rear perspectives thereof.

With reference to the Drawing figures, an initially to FIGS. 1 and 2 thereof, a preferred embodiment of the bench-top dust collector or DC 10 has the intake or front side 12, visible with cowling 14, the latter is formed here of a top horizontal vane and vertical left and right vanes, attached onto a frame 16 formed of sheet steel and with a pre-filter 18 of a washable polyester material being held in the frame 16, and within the zone formed by the cowling 14. A rear compartment 20 is situated at the opposite side of the frame 16. This compartment 20 holds the fans and other electrical components, and has various control elements disposed on one or both sides, as detailed later on. The unit has an air flow axis that extends from the front to the back of the unit, and extends forward from the center of the front side 12.

The cowling's right and left vanes may be attached along respective right and left sides of the front or first opening and a top vane attached along an open upper edge of the front opening. Favorably the vanes are each angled out away from said flow axis or air into and through the dust collector. The cowling is thus configured to create an aerodynamic three dimensional air wall that extends approximately twenty-four inches from the front side of the filter housing.

Figure 3:
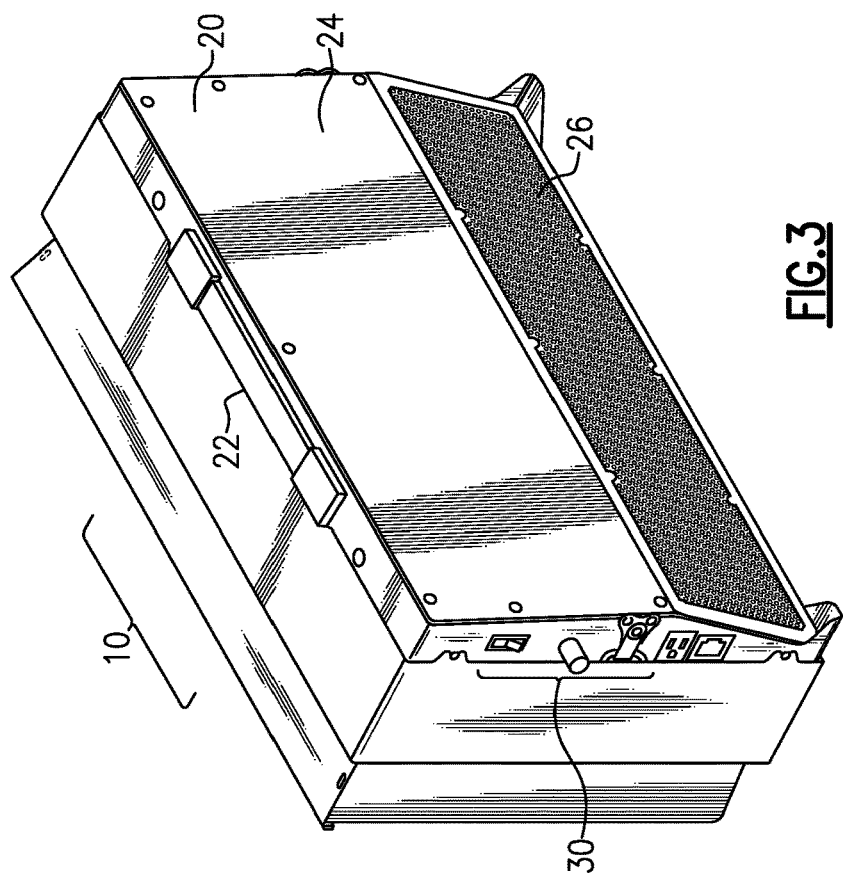

FIGS. 3 and 4 show more of the visible detail of the rear compartment 20, including a carry handle 22 situated at a top surface and with a solid (imperforate) upper panel portion 24 of the rear wall of the compartment and a lower panel 26 here formed as a perforated grille, which in other embodiments could be a mesh or cage. This lower panel grille 26 serves as the outlet or discharge area for the filtered exhaust air from the DC. As seen here the rear side has the upper solid or imperforate upper panel 26 angled outward (rearward) from the top to where it meets the lower panel portion or perforated outlet grille 26 and is thus angled somewhat downward and rearward, so the exhaust air is optimally directed to minimize mixing and disruption of the flow of intake or dust laden air to the intake side 12. Also shown here on the left (FIG. 3) of the rear compartment 20 is a side control cluster 28, here with a power switch, speed conrol knob, auxiliary power outlet, and power cable socket. The accessory outlet may have a feature that automatically turns the dust collector on and off when the power tool is turned on and off, either by sensing current demand or by a wireless signal. An ethernet connector may optionally be provided for remote automated control. Also shown on each side wall of the rear compartment is a respective latch mechanism 30, for mechanically holding the rear compartment 20 to the frame 16 (and to the filters contained within it).

Not shown here, there can be a cork strip provided along the bottom wall of the rear compartment to serve as a resting surface for the unit on a workbench.

Figure 6:
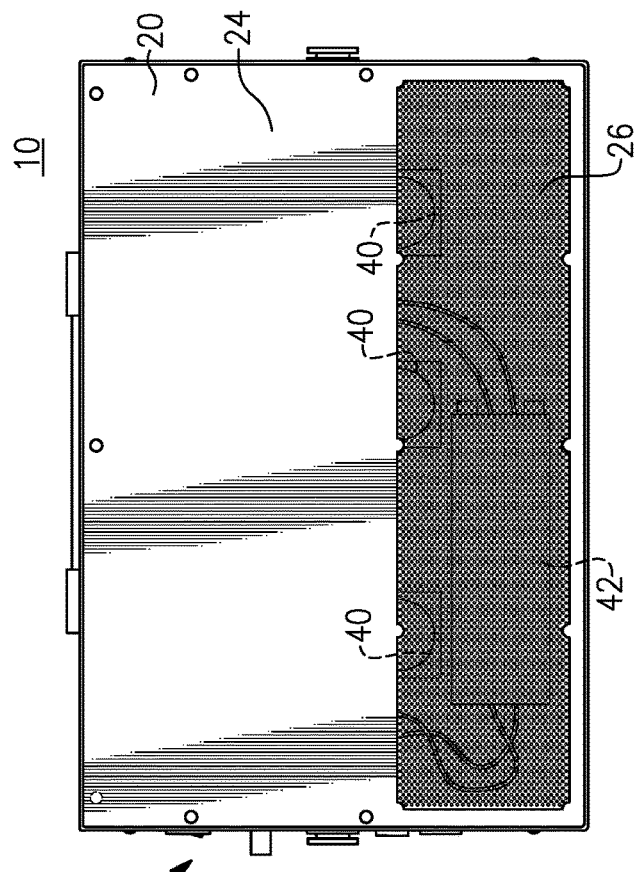
FIG. 6 is a rear (air discharge side) elevation thereof.
Figure 5:
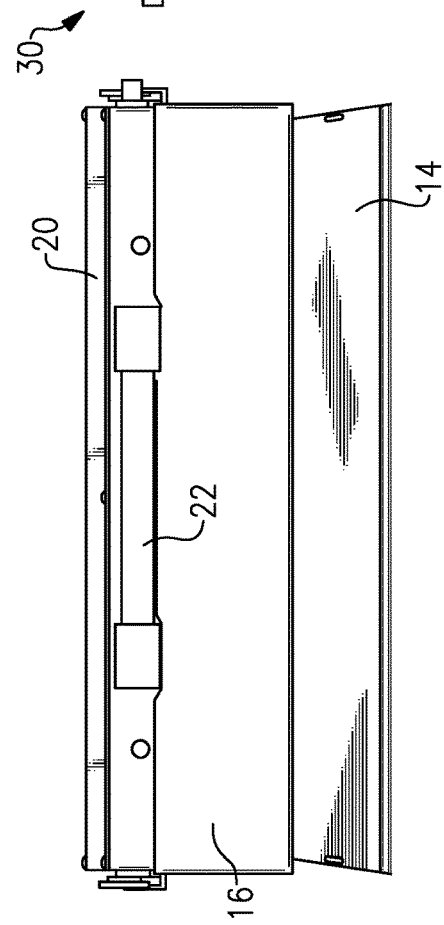
FIG. 5 is a top plan view thereof.

FIG. 5 is a top plan of the benchtop DC 10, showing the cowling 14, the frame 16, and the rear compartment 20 with the carry handle 22, here in the form of a strap. The front elevation of FIG. 6 shows the rear or discharge side of the rear compartment 20 with the solid upper portion 24 and lower perforated grille portion 26. Three of the fans 40 (to be discussed shortly) here are visible or partly visible through the small openings in the grille 26, as is a low-power direct-current supply 42. The latter is provided for the fans and for other electric elements within the compartment 20.

A blanket layer of a sound absorbing material, or mechanical baffle structure, may be present on the inside surface of the upper portion 24, to reduce fan noise and other process noise from the unit.

Figure 9:
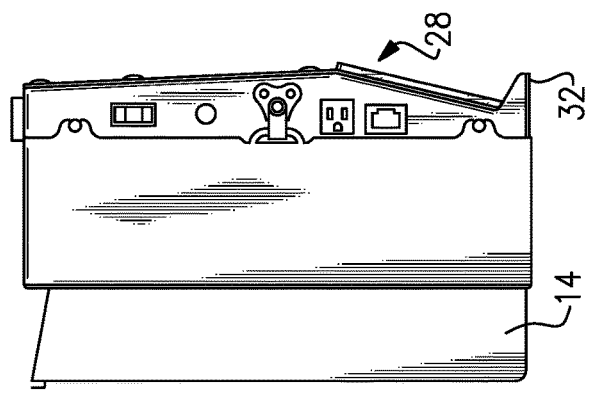
FIGS. 8 and 9 are left side and right side elevations, respectively.
Figure 7:
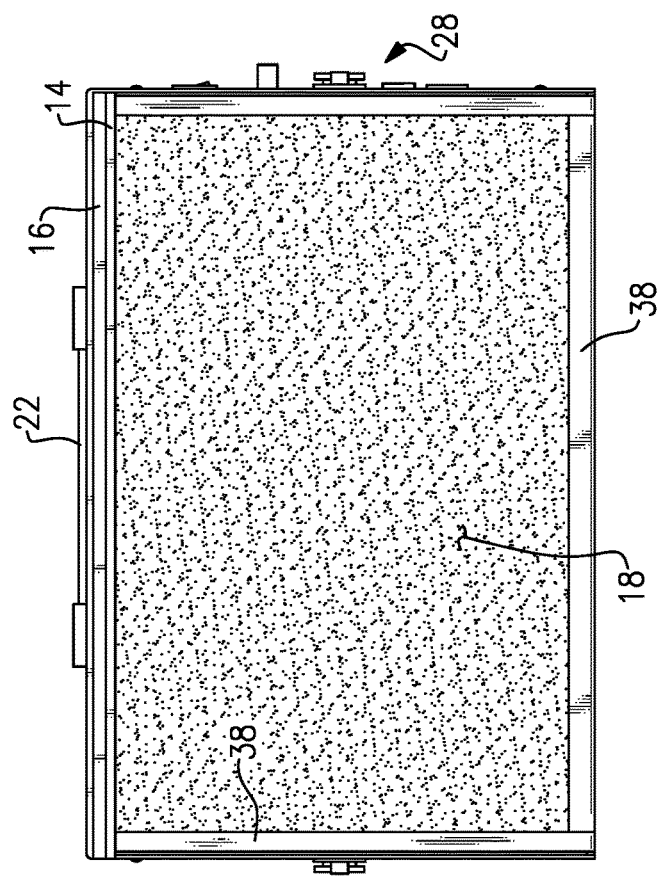
FIG. 7 is a front (intake side) elevation thereof.
Figure 8:
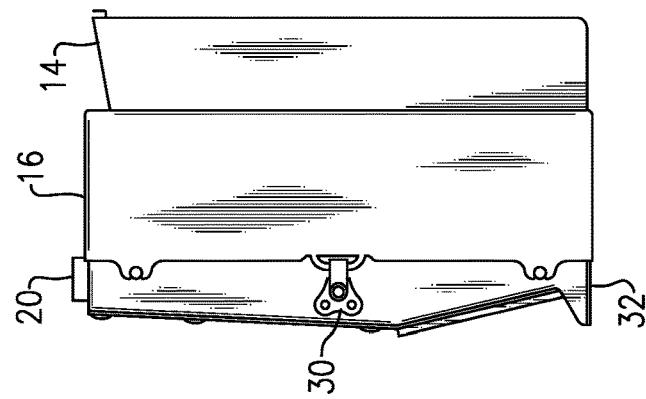

FIG. 7 is a front elevation of the desktop DC 10 here showing the edges of the primary filter of pre-filter 18 being retained behind flanges 38 around the opening formed by the frame 16. This arrangement also holds in the final filter or high performance filter 36 which is hidden in this view (see FIG. 10). The side elevations of FIGS. 8 and 9 show the side vanes of the cowling 14 as will as the frame 16 and rear compartment 20 with latches 30, and on the left end (FIG. 9) the control cluster 28. At the bottom corners of the rear compartment 20, as seen in FIGS. 8 and 9 and also in FIGS. 1 to 4, there are foot members 32 projecting outward for additional stability and to keep the unit from tipping.

Figure 10:
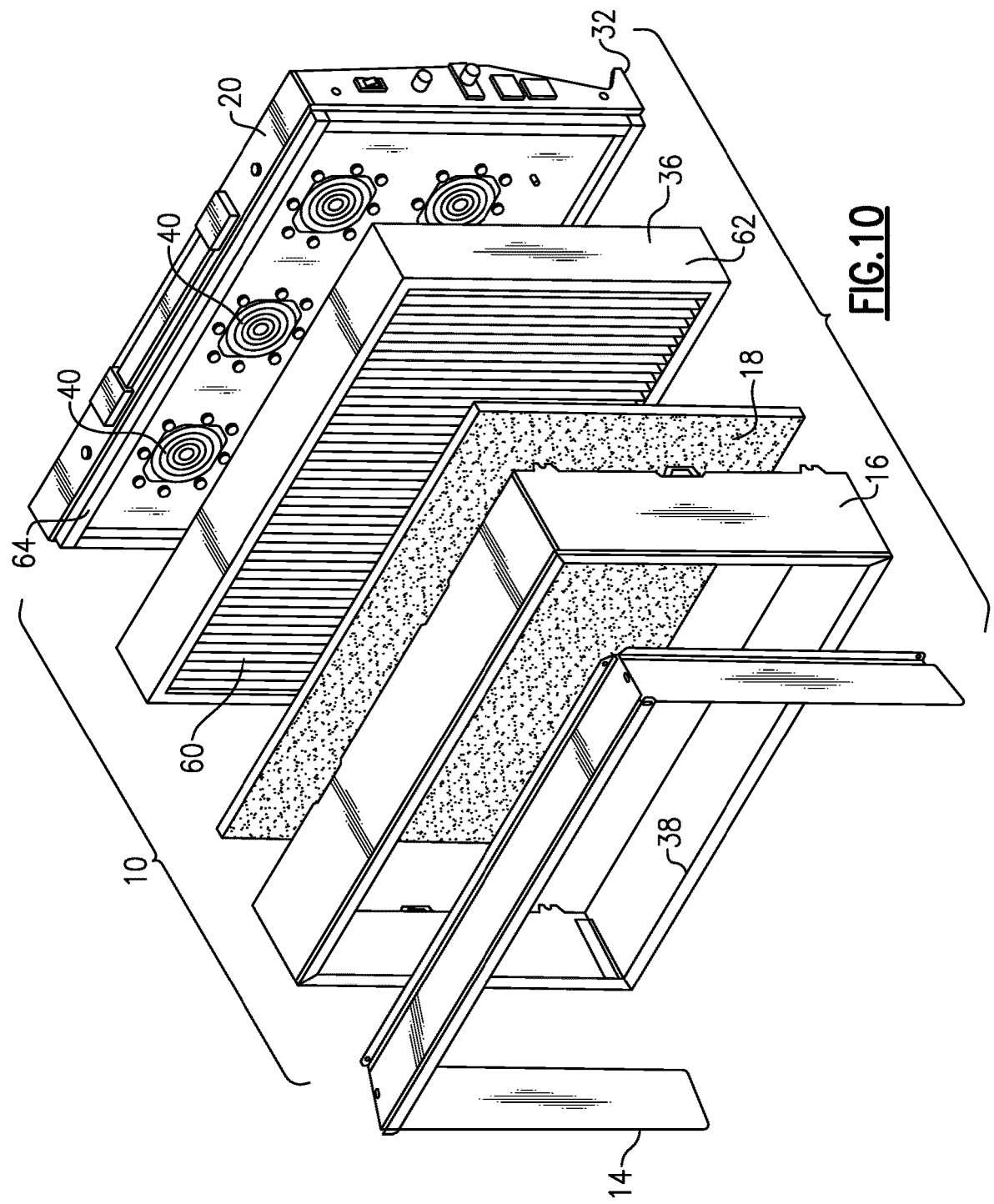
FIG. 10 is an exploded assembly view thereof showing the parts, in order from the front (here, left to right) as intake cowling, front frame, pre-filter, fine or final filter, and front mounting plate, showing a small-fan array.

FIG. 10 is an exploded or assembly view of the benchtop DC 10 with the elements positioned, in order from left front to right rear, as the cowling 14, the sheet metal frame 16, the primary filter or pre-filter 18, and behind that the final filter 35, illustrated as pleated media 60 held together in a filter frame 62. The spaces between pleats serve as repositories for retaining collected dust until it can be removed, or the filter 36 replaced. So long as the media 60 is not saturated with dust, much of the collected loose dust can be pulled out from the filter 58 by means of a vacuum cleaner or the like. This view also shows the arrangement of the small low-power fans 40. Here six fans arranged in two rows of three fans each are mounted on a sheet metal panel in the rear compartment 20 at the distal side of the filter 58. These fans can all be variable speed, and can be controlled for optimal operation or to limit fan noise. The interior space of the rear compartment 20 defines a plenum for the filtered air to flow to the outlet or exhaust at the grille 26. Also as seen here, strips of resilient foam 64 are present at the side edge of the front side of the rear compartment. This holds the components in place with moderate compression when the frame 16 is clamped to the rear compartment.

Figure 11:
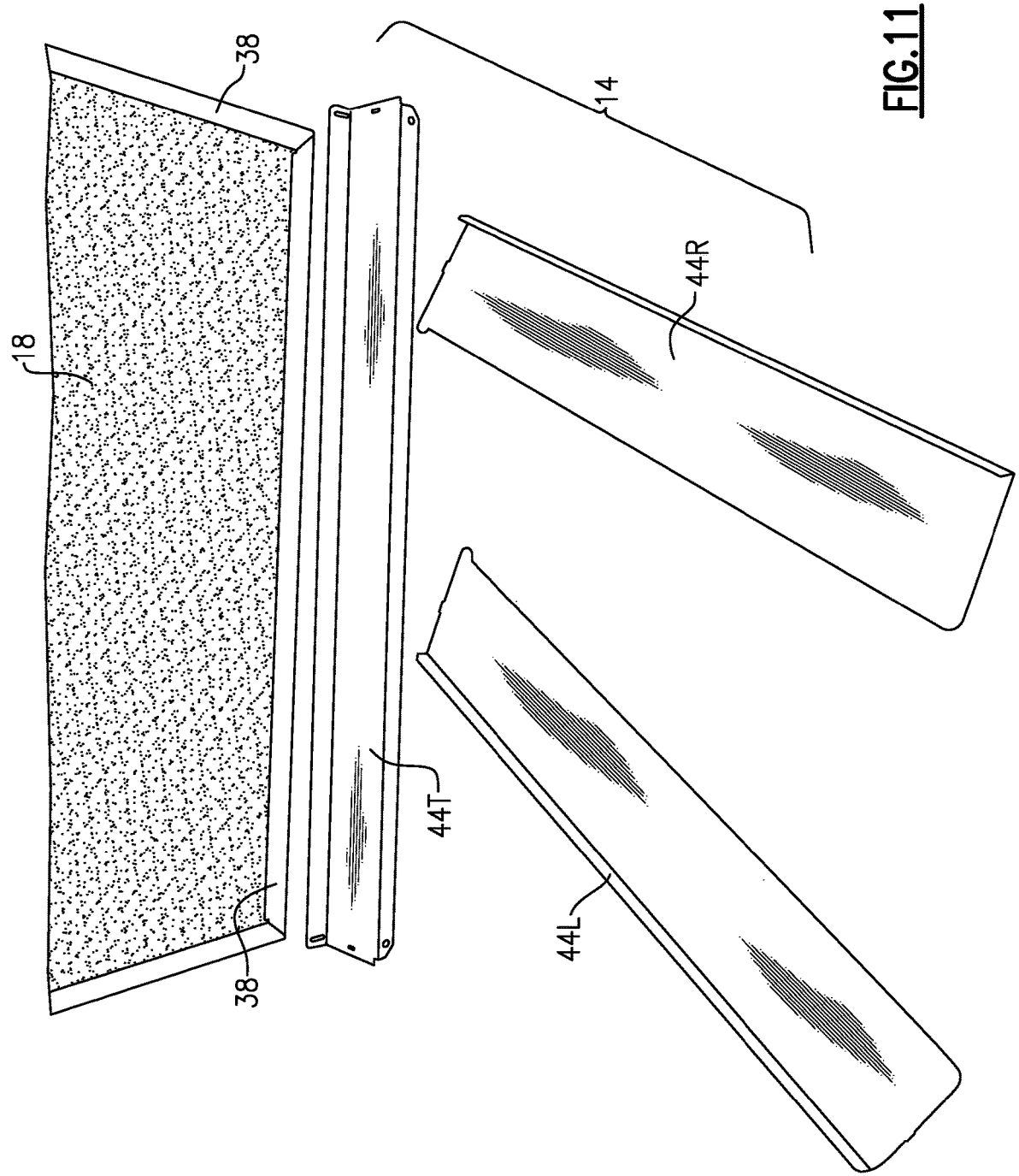
FIG. 11 is a perspective view showing individual vanes of the cowling and the front or intake side of the frame.
Figure 12:
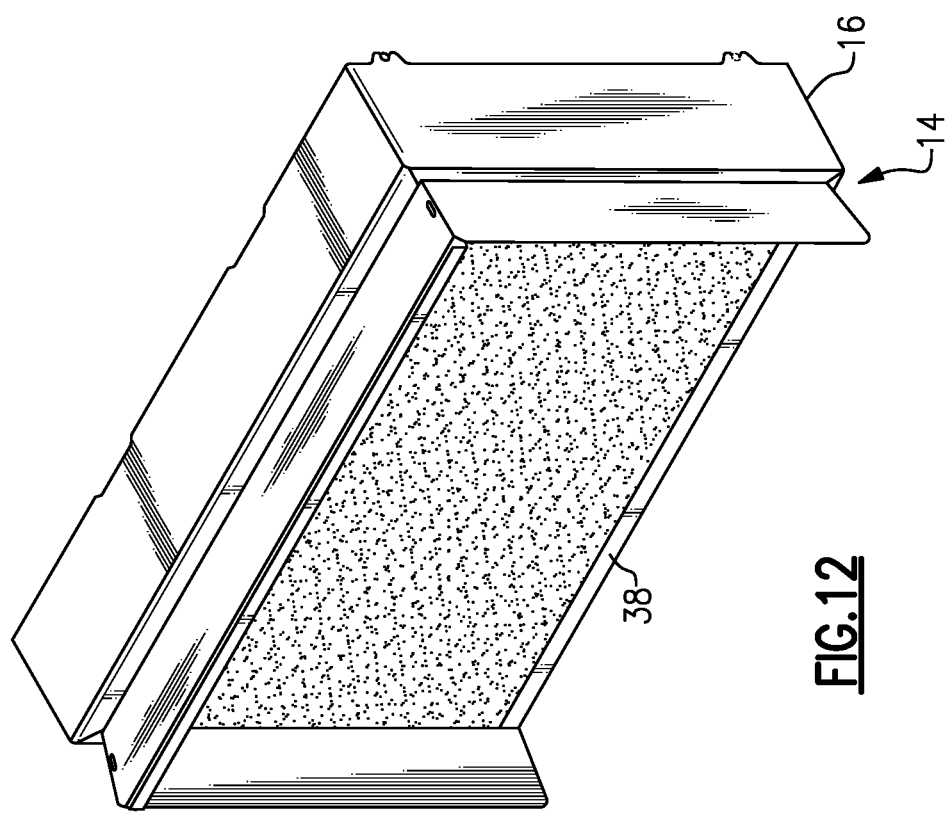
FIG. 12 is a perspective view showing the front side of the frame with the cowling vanes in place.

FIGS. 11 and 12 show the configuration of the unassembled inlet side cowling, and assembled cowling, respectively, as the three pieces, namely a top vane 44T and left and right side vanes 44L and 44R, respectively. The top vane 44T has tabs or projections that can be held in place between the pre-filter 18 and the flange 38 of the frame 16, and the remaining vanes 44L and 44R ae installed in like manner to the left and right sides between the pre-filter 18 and flanges 38. The three vanes mutually support one another to hold the cowling 14 in place without need for screw fasteners. Notches and tabs may be provided on the lower ends of the side vanes 44L and 44R and on the bottom one of the frame flanges 38 to hold the cowling components in place.

Not visible in these views are two female threaded inserts or threaded openings in the top part of the rear compartment 20. Screw eyes may be attached here to serve for attaching to cables for suspending the benchtop DC 10, for example next to a lathe or wherever the workpiece is not on or adjacent the workbench.

The size, shape, appearance, and other features of the benchtop dust collectors of this invention can vary widely from the above described embodiment, depending on the needs for the specific shop or workplace. While the embodiment described here is intended to be plugged into a provided AC electrical outlet, a battery powered benchtop dust collector unit would clearly be within the realm of the present invention, either with replaceable rechargeable power batteries, or with internal rechargeable batteries and a plug-in recharger. The arrangement of the rear compartment 20 with a rear air discharge does not preclude the design of other embodiments which may have a side discharge.

The dust collector of these embodiments may have caster wheels to facilitate easy positioning during use. Also a variable height stand for the unit may be provided to position the unit at a desired level, which may be useful where the workpiece is not resting on a workbench. Also, the source dust collector may be adapted for use as a downdraft table unit by placing it on its back and adding a perforated work surface.

The scope and spirit of the present invention is not to be limited to the aforementioned embodiments, but is to be measured by reference to the appended claims.

We claim:

1. A bench-top dust collector that captures dust emanating from a dust-producing tool or device that lacks a dust connection to a dust extractor, comprising:
   a filter housing having a peripheral wall adapted for removably housing a dust capturing filter, the housing having an open front side and an open rear side;
   a rear compartment adjoined to the rear side of the filter housing, and dimensioned to mate with the open side of the filter housing; the rear compartment having a panel on which are mounted an array of fans for moving air in the direction from said filter housing to rearward, and a rear wall spaced from said panel and array of fans to define a filtered air plenum formed within said rear compartment; and said rear wall having an imperforate upper panel and a lower panel portion formed as a perforated grille for allowing discharge of air from said plenum.

2. A bench-top dust collector according to claim 1 wherein said filter housing comprises a filter frame having a predetermined height and predetermined width, and wherein a front to back dimension from the front opening of said filter frame to the back wall of said rear compartment is no greater than approximately half that of the smaller of said height and said width of the filter frame.

3. A bench-top dust collector according to claim 2 wherein said width and height of said filter frame are approximately 25 inches wide and 16 inches high, respectively, and said front to back distance is no treater than about 8 inches.

4. A bench-top dust collector according to claim 1 wherein said array of fans includes at least two rows of fans, disposed one row above the other and each row having two or more fans, said fans being positioned in alignment with the upper imperforate panel of said rear wall.

5. A bench-top dust collector according to claim 1 wherein the fans in said array include high pressure fans, adapted for creating about 2 inches of water column pressure, in order to achieve greater filtration efficiency.

6. A bench-top dust collector according to claim 1 wherein the fans of said array of fans have continuously variable fan speeds.

7. A bench-top dust collector according to claim 1 further including a washable pre-filter, separable from and not affixed to said final filter, is positioned in advance of said final filter at said open front of said filter frame.

8. A bench-top dust collector according to claim 1 wherein said final filter includes a primary filter that has deep pleats, with depths of substantially 2 to 4 inches.

9. A bench-top dust collector according to claim 1, further comprising a cowling removably affixed onto filter retaining flanges on said filter housing at the open front side thereof.

10. A bench-top dust collector according to claim 1 wherein a cowling is permanently affixed to filter retaining flanges of said housing.

11. A bench-top dust collector according to claim 9 wherein said cowling is formed of a top vane and a pair of side vanes each extending along the top or respective side of the front opening of the frame and with a breadth extending in a forward direction for about three inches.

12. A bench-top dust collector according to claim 9 wherein said cowling forms an aerodynamic air wall that extends from about 24 inches in front of the dust collector to said open front of the dust collector to said open front of the frame, such that any dust produced in a region within about 24 inches in front of the filter frame is directed thereto and is drawn into the filter housing of the dust collector.

13. A bench-top dust collector according to claim 1 wherein said back wall of said rear compartment includes a blanket of noise-deadening material.

14. A bench-top dust collector according to claim 1, comprising a power converter within the rear compartment that provides low-voltage direct current to said array of fans.

15. A source dust collector comprising
a filter housing with an open front side and an open rear side, the filter housing containing at least one high performance dust filter situated within the housing between said open front side and said open rear side of the filter housing;
a rear compartment situated against the rear side of the filter housing and including a mounting plate on which at least one high-static-pressure high flow fan is mounted to induce air flow from said filter housing into said rear compartment, the rear compartment having a rear wall defining a filtered air plenum, with the rear wall having an upper imperforate panel and a lower portion of said rear wall being perforated to permit air flow to rearward from said plenum; and
an intake air cowling attached on at least sides and top of the filter housing front side.

16. A source dust collector according to claim 15, wherein said cowling comprises right and left vanes attached along respective right and left sides of said open front side; with said vanes each being angled out away from a flow axis of said dust collector; and configured to create an aerodynamic three dimensional air wall that extends approximately twenty-four inches from the front side of the filter housing; whereby dust arising from any dust-making activities within said aerodynamic air wall will be contained and drawn into the dust collector.

17. A source dust collector according to claim 15, wherein said rear compartment mounting plate holds a plurality of high-static-pressure fans arranged in an array, configured to create an even flow over the surfaces of the media of the filter.

18. A source dust collector according to claim 15, wherein the vanes of said cowling are removably attached onto edge flanges on the open front side of said filter housing.

19. A source dust collector according to claim 17, wherein said vanes are detachable from said edge flanges.

20. A source dust collector according to claim 15, said filter housing containing a removable, replaceable and washable pre-filter positioned in said filter housing in advance of said high performance dust filter, and removable therefrom.

* * * * *